United States Patent [19]
Bertsch et al.

[11] 4,447,218
[45] May 8, 1984

[54] METHOD AND APPARATUS FOR THE AUTOMATIC FOLDING OF FLOPPY DISC STORAGE ENVELOPES

[76] Inventors: Dieter A. Bertsch, 940 Auburn Ct., Fremont, Calif. 94538; Mark A. Finkle; James D. Fishman, both of 3475 Victor St., Santa Clara, Calif. 95050

[21] Appl. No.: 222,897

[22] Filed: Jan. 6, 1981

[51] Int. Cl.³ ............................................. B32B 3/04
[52] U.S. Cl. .................... 493/251; 493/141; 493/242; 493/470; 493/133
[58] Field of Search ............... 493/254, 264, 141, 457, 493/470, 129, 133, 946, 242, 10, 13, 14, 15, 21; 53/206, 456, 460, 563, 383

[56] References Cited
U.S. PATENT DOCUMENTS

| Re. 22,292 | 3/1943 | Gaubert | 493/251 |
|---|---|---|---|
| 2,350,874 | 6/1944 | Buxbaum | 493/133 |
| 2,609,306 | 9/1952 | Pasotti | 493/331 |
| 2,771,292 | 11/1956 | Emerson | 493/141 |
| 3,555,778 | 1/1971 | Kapare | 53/383 |
| 3,709,110 | 1/1973 | Lubersky | 93/36.6 |
| 3,884,132 | 5/1975 | Snodgrass | 93/59 MT |
| 3,926,424 | 12/1975 | Gerstenberger | 270/62 |
| 4,232,592 | 11/1980 | Gingerich | 493/10 |
| 4,239,572 | 12/1980 | Tomita | 156/227 |
| 4,262,582 | 4/1981 | Sugimoto | 493/25 |

*Primary Examiner*—Nicholas P. Godici
*Assistant Examiner*—Kurt Rowan
*Attorney, Agent, or Firm*—Jones, Tullar & Cooper

[57] ABSTRACT

Presented is a method and apparatus for the substantial automatic folding of flat pre-cut blanks of sheet material to form storage envelopes for floppy or rigid disc storage devices. The machine includes a pedestal formed in part by an electromagnet associated with a clamp plate that constitutes an Armature to retain the sheet material immovable during the folding operation. Additionally, there are provided three rams each associated with a pivotal shoe for folding selected portions of the flat sheet, and reciprocable glue dispensing means are provided for dispensing glue at the appropriate time, in an appropriate amount, and in an appropriate location. The mechanical aspects of the apparatus are connected to and controlled by a computer that scans the functions of the machine to determine if the machine is operating properly and signals the operator through an alphanumeric display panel if there is a malfunction in the apparatus.

28 Claims, 14 Drawing Figures

METHOD AND APPARATUS FOR THE AUTOMATIC FOLDING OF FLOPPY DISC STORAGE ENVELOPES

BACKGROUND OF THE INVENTION

1. Field of the Invention

This invention relates to envelope folding apparatus and machines, and particularly to a machine or apparatus for the folding of storage envelopes for floppy disc storage devices for computer-operated or monitored equipment.

2. Description of the Prior Art

A search of the prior art has not been made prior to the preparation of this specification and accordingly, no prior art patents are referenced. Floppy disc storage envelopes are a known entity, and no claim is made to the particular form or design of the envelope per se. This invention is directed specifically to the apparatus or machine for accepting conventional pre-cut blanks of sheet material from which floppy disc envelopes are conventionally formed, and operating on or processing such flat sheet material to form a completed floppy disc storage envelope.

Accordingly, it is one of the objects of the present invention to provide a machine which will accept and process conventionally configured blanks from which floppy disc storage envelopes are conventionally fabricated.

It is another object of the invention to provide a machine for accepting the pre-cut sheet blanks of a floppy disc storage envelope and processing that pre-cut blank by automatic means to produce a complete floppy disc storage envelope.

A still further object of the invention is the provision of a floppy disc storage envelope folding machine that is substantially automatic in its operations and which interfaces with a computer programmed to provide an alphanumeric display for the guidance of the operator.

A still further object of the invention is the provision of a floppy or storage envelope folding machine which may be converted quickly and easily from a machine which folds, for instance, floppy disc storage envelope blanks formed from polyvinyl chloride to one which will handle floppy disc storage envelope blanks fabricated from paper or other stock.

Some floppy disc storage envelopes are fabricated from paper and are appropriately glued to form the envelope. Other floppy disc storage envelopes are fabricated from polyvinyl chloride or nylon material and are either heat sealed or glued, depending upon the preference of the manufacturer. Accordingly, it is still another object of the present invention to provide a floppy disc storage envelope folding machine that is easily and quickly convertible from a folding machine which heat seals the floppy disc envelopes to a machine which glues such floppy disc storage envelopes and vice versa.

In the operation of automatic equipment, particularly those equipments interfaced with a computer which scans and exercises some control over the operation of the machine, it is often perplexing for the operator to determine the particular cycle in which the machine is operating. Accordingly, a still further object of this invention is to provide a floppy disc storage envelope folding machine which interfaces with a computer in such a way that the operation of the machine is communicated to the operator through an alphanumeric display panel which gives the status information at all times.

Additionally, with equipment that is computer-scanned or computer-operated or controlled, it is sometimes difficult for the operator to override the computer control to effect a change in the sequence of operation of the machine. Accordingly, a still further object of the invention is to provide a plurality of switch means under the control of the operator for setting up and controlling the machine, which plurality of switches are polled or scanned by the computer at specified times to achieve a particular function, thus placing in the hands of the operator positive control of the equipment despite the fact that it interfaces with a computer.

Another object of the invention is the provision of a floppy disc storage envelope folding machine that incorporates machine functions and computer functions through a plurality of operator-actuated means.

The invention possesses other objects and features of advantage, some of which, with the foregoing, will be apparent from the following description and the drawings. It is to be understood however that the invention is not limited to the embodiment illustrated and described, since it may be embodied in various forms within the scope of the appended claims.

SUMMARY OF THE INVENTION

In terms of broad inclusion, the floppy disc storage envelope folding machine of the invention includes a housing and a support frame for supporting the machine housing at a convenient level for operation of the machine by an operator in either a standing or sitting position. Within the housing is provided a pedestal including as a component thereof an electromagnet. One end of the electromagnet constitutes a platen across which an armature in the form of a flat tongue plate is adapted to be secured by the magnetic field generated by the electromagnet. Associated with the pedestal, and particularly with the platen end thereof and the tongue plate, are a plurality of pneumatically operated sheet-folding assemblies automatically actuable at preset intervals to fold a floppy disc storage envelope blank in appropriate directions to form an envelope therefrom. Means are also provided, working in conjunction with the sheet-folding assemblies, for applying glue to selected portions of the blank so that when the blank is folded into its final configuration, it is adhesively held together to form a completed floppy disc storage envelope. The completed envelope is then partially ejected by the machine after the electromagnet is deactivated to permit withdrawl of the completed envelope from the machine by the operator.

DESCRIPTION OF THE PREFERRED EMBODIMENT

Figures 2, 3:
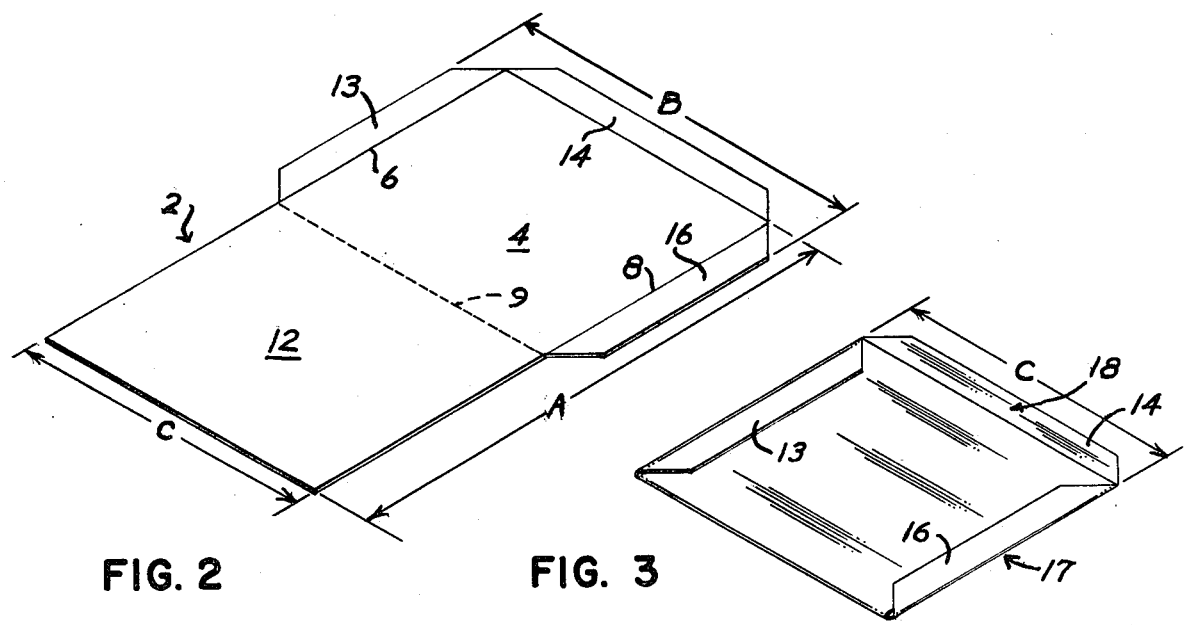
FIG. 2 is a perspective view of the pre-cut flat sheet blank from which the envelope is formed.
FIG. 3 is a perspective view of the completed envelope.

In terms of greater detail, the method and apparatus for the automatic folding of floppy disc storage envelopes is dictated in part by the configuraiton of the envelope as illustrated in FIGS. 2 and 3. As shown in FIG. 2, the envelope is formed from a blank designated generally by the numeral 2, the blank being pre-cut from a flat sheet 3 formed from polyvinyl chloride or paper and having a generally elongated configuration, i.e., its long dimension A being greater than its transverse dimension B, and both of these dimensions being greater than the transverse dimension C as illustrated in FIG. 2. As there shown, the sheet 3 includes a main body portion 4 defined by score lines 6, 7, 8 and 9, the score line 9 separating the main body portion 4 from a tongue portion 12 having the transverse dimension C as shown. The main body portion 4 on its remaining three sides is bounded by flaps 13, 14 and 16 defined by their outer edges and the score lines 6, 7 and 8, respectively. While score or fold lines are illustrated in FIG. 2, it will of course be understood that such score lines may be omitted without departing from the spirit of the invention.

After insertion of the flat sheet blank 2 in the apparatus for folding, and after the apparatus performs its functions, the completed envelope is ejected in the form illustrated in FIG. 3 and designated generally by the numeral 17. In that figure, it will be seen that the tongue portion 12 of the sheet has been folded along the score line 9 so that it overlies the main body portion 4. The two side flaps 13 and 16 have been folded along the score lines 6 and 8, respectively, so that they overlap the lateral edge portions of the tongue portion 12, to which they are secured either by an appropriate adhesive disposed therebetween as will hereinafter be explained, or by "heat staking" which will also hereinafter be explained. Thus, the ultimate form of the envelope as it is ejected from the apparatus illustrated in FIG. 1, is as illustrated in FIG. 3 and includes an open side edge or pocket designated generally by the numeral 18 and lying next adjacent the flap 14.

Figure 1:
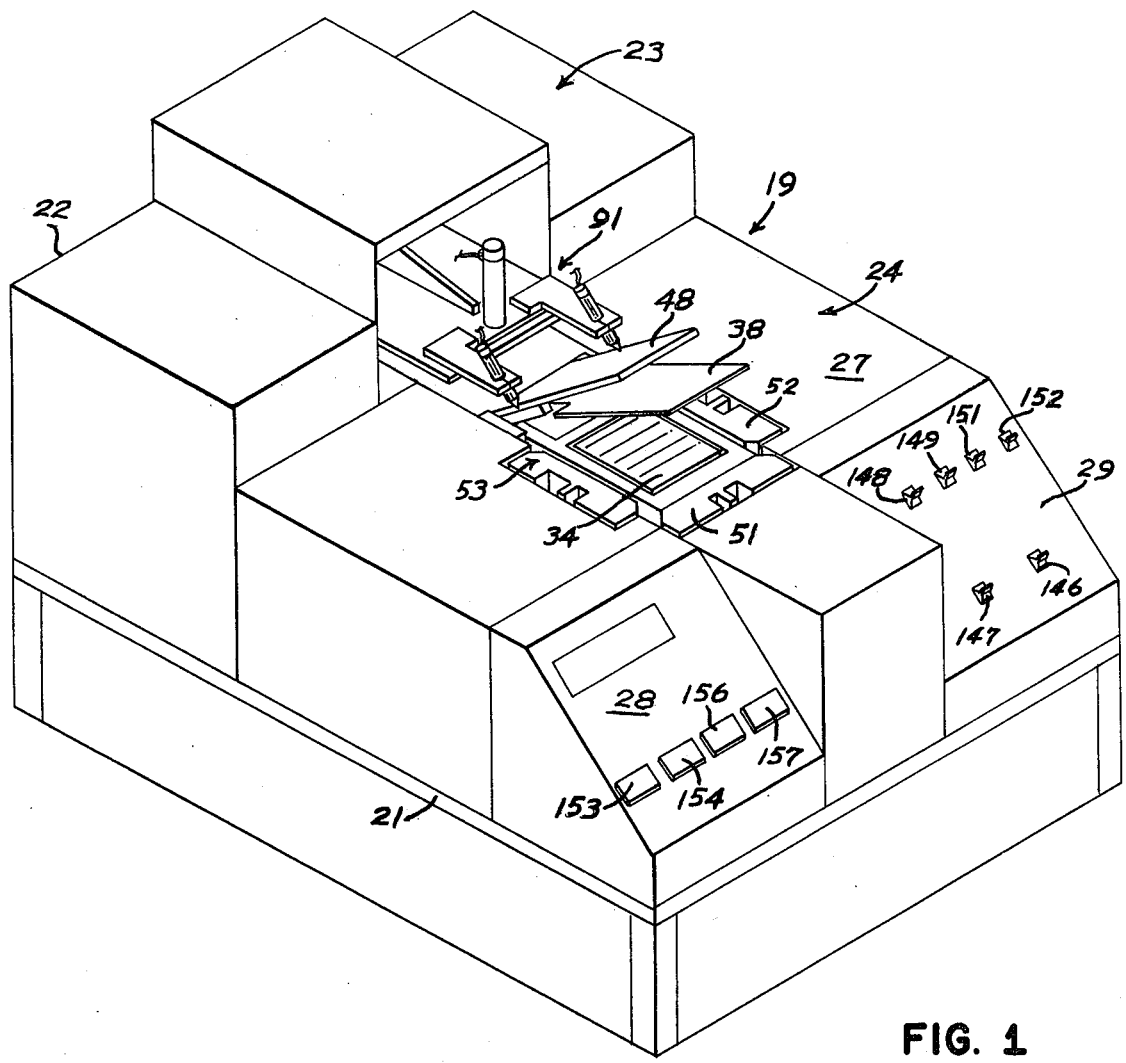
FIG. 1 is a perspective view of the apparatus forming the subject matter of the invention.

Referring now to FIGS. 1 through 7, the apparatus for accomplishing the folding of the envelope as illustrated in FIG. 3 is illustrated generally in FIG. 1 and designated therein by the numeral 19. As illustrated in these figures, the apparatus comprises a novel combination of elements working in conjunction with an operator and the computer control means illustrated in FIGS. 8 through 13, and the pneumatic means illustrated schematically in FIG. 14.

Referring specifically to FIGS. 1 through 7, the mechanical combination illustrated in the apparatus 19 includes a base plate 21 on which is mounted a housing 22 having a rear section designated generally by the numeral 23, an intermediate section designated generally by the numeral 24 and a front panel section designated generally by the numeral 26. The rear housing portion 23 encloses mechanical elements that will hereinafter be explained, while the intermediate housing portion 24 is provided with an aperture in its top surface 27 as illustrated for purposes which will hereinafter be explained. The front panel portion 26 includes a display panel 28 and a switch panel 29 as illustrated.

Referring to FIGS. 4 through 7, inclusive, mounted on the base plate 21 are means for receiving and clamping the pre-cut flat sheet blank 2 as illustrated in FIG. 2, such means comprising an electromagnet designated generally by the numeral 31 which is suitably suspended and secured to a support plate 32 having a generally central aperture 33. The electromagnet is provided at its upper end with a ferromagnetic platen 34 projecting through the aperture in the support frame 32 and accessible from the front of the apparatus, the electromagnet assembly being generally located within the intermediate housing portion 24.

Figure 4:
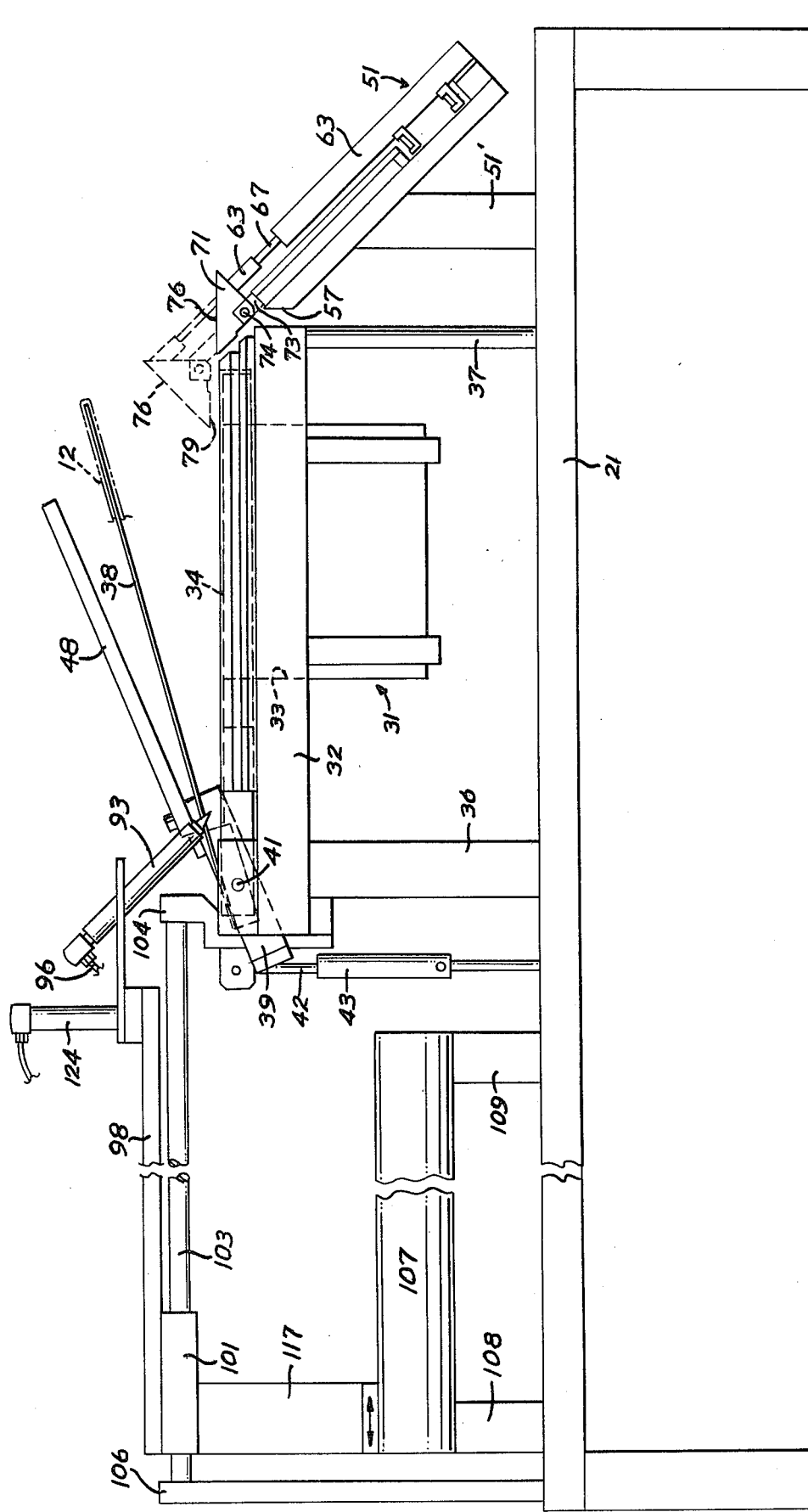
FIG. 4 is a substantially diagrammatic side elevational view of the operating mechanism for folding the blank into an envelope.
Figures 12, 13:
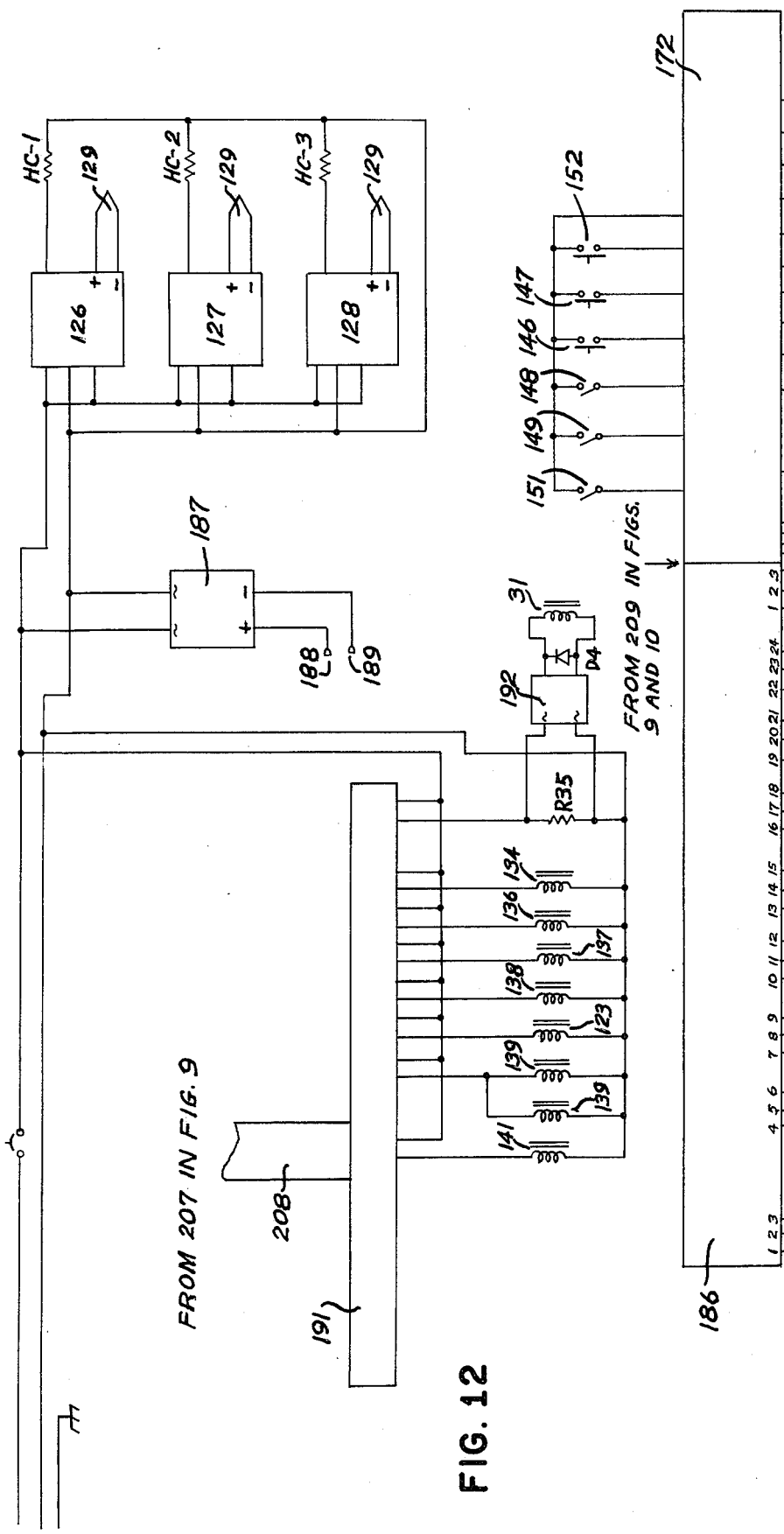
FIG. 12 is a wiring diagram illustrating schematically some of the functions performed by the machine and monitored by the operator and the computer control system.
FIG. 13 is a view similar to FIG. 12 and illustrating schematically the optoelectronic interrupter modules and the bank of thumbwheel switches.

As illustrated in FIG. 4, the support frame 32 is supported in an elevated position above the base frame 21 by rear corner posts 36 and front corner posts 37. Thus, when the electromagnet is energized from an appropriate source of power as illustrated in FIG. 12, the platen 34 becomes magnetized by a strong magnetic field that strongly attracts any associated ferromagnetic member, such as an armature that might be brought into close proximity to it. Thus, to fold the pre-cut flat sheet blank 2 into the configuration illustrated in FIG. 3, the flat blank is adapted to be superimposed over the platen 34. Then the electromagnet is energized. Thereafter, under automatic controls that will hereinafter be explained, and the control means for which are depicted in FIGS. 8 through 14, a ferrous tongue plate 38 is caused to pivot downwardly and impinge on the flat blank as it lies superimposed over the platen 34, the ferrous tongue plate functioning as an armature to close the magnetic circuit. The tongue plate is of course held tightly to the platen with the blank sandwiched therebetween.

The tongue plate 38 is appropriately mounted on a pivot block 39 pivoted on the support frame 32 adjacent the rear support posts 36 by a pivot pin 41. As illustrated in FIG. 4, the pivot block 39 extends on both sides of the pivot pin 41, the tongue plate 38 projecting to the right from one end of the pivot block while the opposite end of the pivot block is pivotally connected to the ram 42 of a double-acting air cylinder 43 actuated through appropriate controls (FIGS. 12 and 14) to effect pivotal movement at selected times of the pivot block 39, thus bringing the tongue plate 38 into a flat contiguous superimposed position over the flat blank supported on the platen 34. As will be seen from a comparison of FIGS. 4 and 5, the tongue plate 38 is dimensioned so that it has a transverse dimension (as viewed from top to bottom in FIG. 5) that is substantially the same as dimension C as illustrated in FIG. 2. Stated another way, although the flat blank is not illustrated in FIG. 5, with the flat blank inserted and disposed beneath the tongue plate 38, the lateral edge 44 of the tongue plate will be substantially coincident with the score or fold line 8 of the blank, while the lateral edge 46 of the tongue plate will be substantially coincident with the score or fold line 6, and the tongue portion 12 of the flat blank will extend to the right with the score or fold line 9 substantially coincident with the forward edge 47 of the tongue plate 38.

To securely hold the tongue plate 38 in tight contiguous engagement with the top surface of the blank 2 which is in turn in tight engagement with the top surface of the platen 34, and in addition to the magnetic force that retains the tongue plate, a clamp plate 48 is provided, extending cantilever fashion from the pivot block 39 and fabricated from a non-ferromagnetic material and adapted to exert a mechanical holding force on the tongue plate and the folded back tongue portion 12 of the blank. Thus, after the flat blank 2 has been inserted and properly positioned by the operator in a superposed relationship over the platen 34, the air cylinder 43 is actuated and the tongue plate 38 pivots downwardly to clamp the flat blank and to provide sharp edges 44, 46 and 47 over which the flaps 16 and 13 and tongue portion 12, respectively, may be folded. The clamp plate 48 is then pivoted into a clamping relationship with the underlying tongue portion 12 and the tongue plate 38 after the tongue portion 12 has been folded lack upon the tongue plate. The dimensions of the clamp plate 48 are selected so as to provide a peripheral edge portion of the tongue plate 38 (and tongue portion 12) exposed beneath the clamp plate 48, as illustrated clearly in FIG. 5.

With the flat sheet blank securely clamped to the top surface of the electromagnetic platen 34, it is possible to fold the flap extensions 13 and 16 without shifting the position of the remainder of the blank. To accomplish such folding function, means are provided operatively associated with the electromagnet and clamping means and the lateral edges of the body portion 4 of the flat sheet blank to effectively fold the tongue portion 12 into a superposed relationship with the body portion 4 of the flat sheet blank, and to then subsequently fold over onto peripheral edge portions of the tongue portion 12, the flap extensions 13 and 16 to achieve the configuration illustrated in FIG. 3.

Reference is again made to FIGS. 4, 5 and 6, where the means operatively associated with the clamping means and a flat sheet blank held captive in a superposed relationship over the platen 34 is seen to comprise a slide assembly designated generally by the numeral 51, supported by an appropriate post 51' on the base plate 21. One such slide assembly 51 is associated with the forward edge 47 of the tongue plate 38, while second and third slide assemblies 52 and 53 are associated with the lateral edges 44 and 46, respectively of the tongue plate 38 as shown. In the interest of brevity in this description, since the slide assemblies 51, 52 and 53 are identical except for their position in relation to the associated clamping means, only one such assembly will be described in detail.

Figure 5:
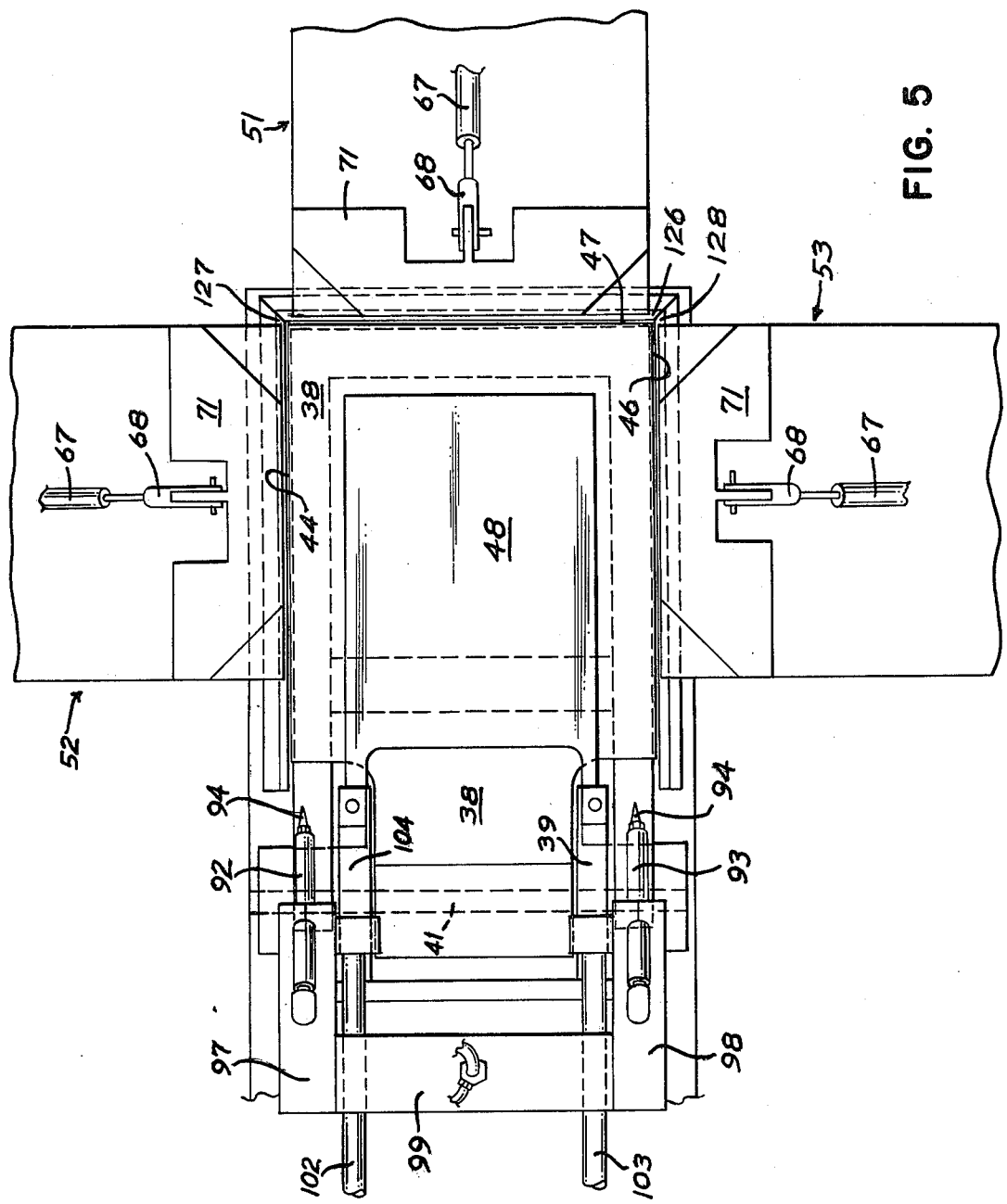
FIG. 5 is a substantially diagrammatic plan view of the mechanism illustrated in FIG. 4. Portions of the structure are broken away to reduce the size of the view.
Figures 6, 7:
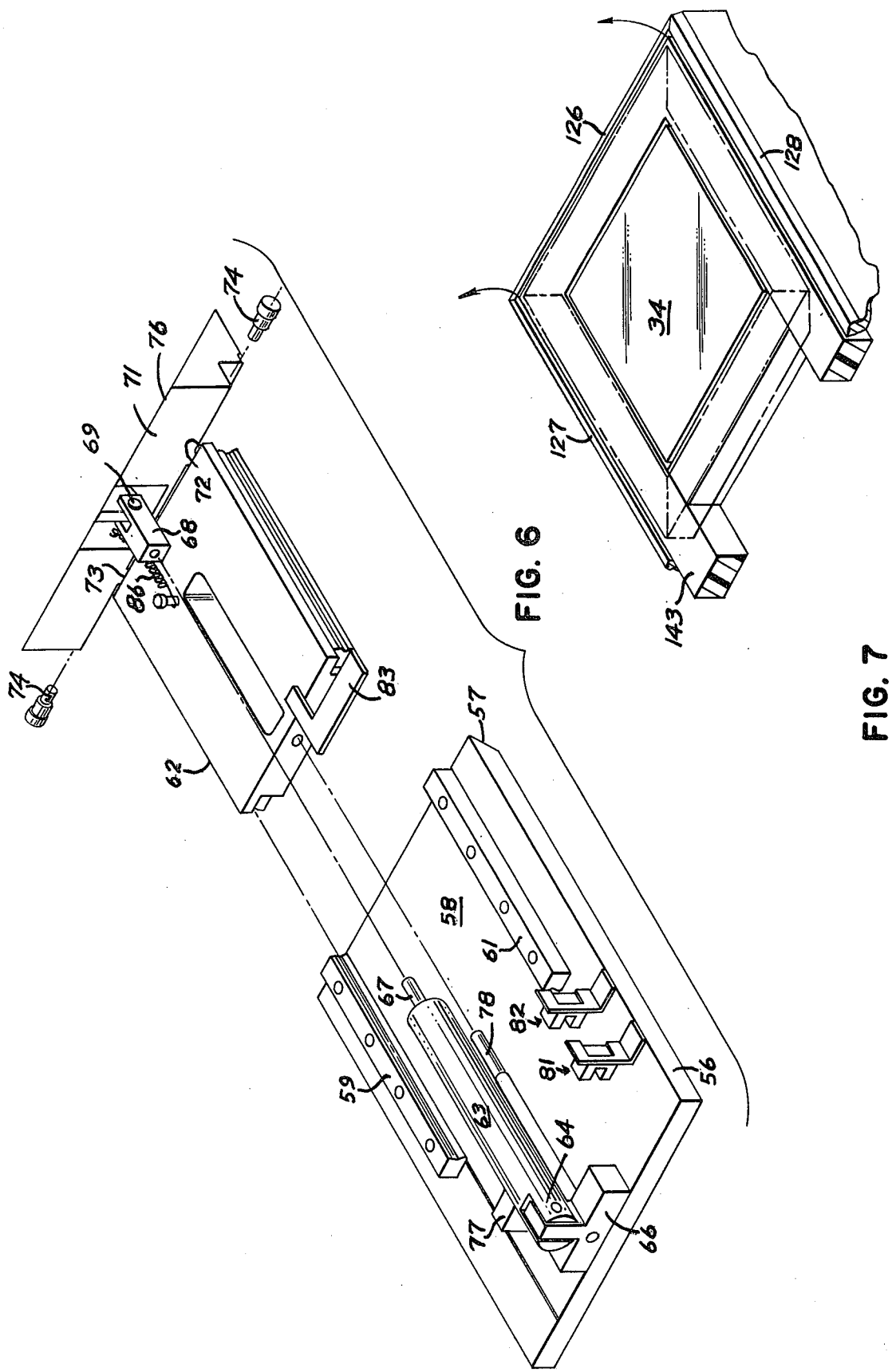
FIG. 6 is a fragmentary perspective view of one of the three air-actuated slide assemblies which when activated fold a predetermined portion of the envelope blank.
FIG. 7 is a fragmentary perspective view of the platen-end of the electromagnet in cooperative association with the envelope ejector frame.

For this purpose, reference is made to FIGS. 4, 5 and 6, especially FIG. 6, where the slide assembly is illustrated in detail. Each of the means operatively associated with the flat blank receiving means and the clamping means includes a slide base plate 56, supported in an inclined relationship as illustrated in FIG. 4, each of the slide base plates 56 being fixed to an associated post 51' so that the upper edge 57 of the slide base plate lies next adjacent the associated front or lateral edges of the support plate or frame 32, while the lower end of the base plate 56 lies next adjacent the base plate 21. The inclined relationship of the slide base plate 56 with respect to the base plate 21 and the support plate or frame 32 is shown clearly in FIG. 4.

Each slide base plate 56 is provided on its top surface 58 with a pair of laterally spaced slide bearing guide members 59 and 61 mounted adjacent opposite lateral edges of the slide base plate in parallelism with each other and in parallelism with such lateral edges of the slide base plate. The slide bearing guide members slidably receive a slide plate designated generally by the numeral 62, and adapted to reciprocate axially with respect to the base plate 56 as will hereinafter be explained. Also mounted on the slide base plate 56 is an air cylinder 63 one end 64 of which is pivotally anchored to an anchor block 66, while the other end extends freely over the slide plate 62 and is provided with a ram 67 the extreme end of which remote from the cylinder 63 is attached to a front mounting block 68 which is in turn pivotally attached by a pivot pin 69 to a folding bar 71 which is itself pivotally mounted on the forward edge 72 of the slide plate 62 by means of appropriate spaced lugs 73 projecting from the forward edge 72 of the slide plate 62, the folding bar being pivoted to such lugs by means of pivot pins 74 (FIG. 4).

As indicated in FIGS. 4 and 6, the folding bar 71 is provided with a top surface 76 which, in the relationship illustrated in FIGS. 4 and 6, lies parallel and substantially level with the top surface of the platen 34 when the doubleacting cylinder 63 has been actuated so as to place the ram 67 and the folding bar 71 in a retracted position as illustrated in full lines in FIG. 4. In this retracted position, when the flat sheet blank as illustrated in FIG. 2 is superimposed over the platen 34, the tongue portion 12 of the flat sheet blank extends over the flat surface 76 of the folding bar.

Actuation of the air cylinder 63 to extend the ram 67 as indicated in FIG. 4 in broken lines, causes the slide plate 62 to advance from its retracted position in which it abuts a rear stop block 77 (FIG. 6), to a forward position in which a stop lug (not shown) on the underside of the slide plate 62 engages the forward end of a slot 78. Continued extension of the ram 67 of air cylinder 63 beyond this point, i.e., beyond the forward stopped position of the slide plate 62, causes the folding bar 71 to tilt through an angle of 45° into the position illustrated in broken lines in FIG. 4. It will of course be understood that since the tongue portion 12 of the flat sheet blank 2 overlies the top surface 76 of the folding bar 71 in its retracted position as illustrated in full lines in FIG. 4, when the folding bar 71 moves upwardly and commences pivoting through an angle of 45°, the overlying tongue portion 12 of the flat sheet blank that projects beyond the forward edge 47 of the tongue plate 38 is folded along the score line 9 over the forward edge 47 of the tongue plate so that tongue portion 12 now overlies the tongue plate 38 as illustrated in broken lines in FIG. 4.

After the tongue portion 12 has been folded or doubled back upon the tongue plate 38, the clamp plate 48 clamps on the tongue portion 12, and the folding means or assemblies 52 and 53 associated with the lateral edges of the blank, namely, associated with the projecting flaps 16 and 13 adjacent the lateral edges 46 and 44, respectively, are activated so that the folding bar of each of these assemblies, each underlying an associated flap extension, causes each flap to be folded along the associated score lines (6 and 8) so that the flap portions 13 and 16 now overlie a marginal edge portion of the tongue portion 12 that has previously been folded or doubled back upon the tongue plate 38. It will of course be understood that the folding assembly 51 positioned opposite the end edge 47 of the tongue plate is actuated in point of time before the two lateral folding assemblies so as to place the tongue portion 12 in position to be overlapped by the tab or flap extensions 13 and 16 when these are folded.

It should be understood that the sequential operation of the folding systems or assemblies designated generally by the numerals 51, 52 and 53 are controlled through the control circuitry illustrated in FIGS. 8 through 14. It should also be understood that when the folding bar 71 has assumed the position illustrated in broken lines in FIG. 4, the lower surface 79 impinges against the associated flap extension so as to press this associated flap extension against the associated surface of the tongue portion 12. This relationship of the parts of the envelope is illustrated in FIG. 3.

To control the sequential operation of the slide mechanism or system depicted in FIGS. 4 and 6, there is mounted on the slide base plate 56 two photocells 81 and 82 positioned thereon so as to cooperate with a photocell vane 83 mounted on the slide plate 62. Movement of the slide plate 62 causes the photocell vane to interrupt light beam generated by each of the photocells, such interruption of the beam of a photocell being detected by the control circuitry illustrated in FIGS. 8 through 13. Thus, with the slide plate 62 in its fully retracted position against the rear stop block 77, the photocell vane will interrupt the beam in photocell 81 and thus indicate to the computer that the slide plate is in its fully retracted position. On the other hand, when the slide plate 62 is advanced, as when the air cylinder 63 is activated to advance the ram 67, the photocell vane is shifted from its position interrupting the beam of photocell 81 to a position in which it interrupts the beam of photocell 82.

Referring to FIG. 6, it will be seen that the folding bar 71 is resiliently retained in the position illustrated by a coil spring 86 one end of which is attached to the folding bar while the other end is attached to the slide plate 62 as shown so as to impose a resilient biasing force on the folding bar. Thus, when the ram 67 is advanced to effect pivotal movement of the folding bar 71 through 45° as previously described, the coil spring 86 is tensioned so that the resilient biasing force on the folding bar is increased, tending to return it to its position as illustrated in FIG. 6, but being restrained from return to that position by the extended ram 67. However, as soon as the air cylinder 63 is actuated so as to retract the ram 67 and the slide plate 62, the coil spring 86 then pivots the folding bar back to its initial position.

The purpose of folding the flaps 13 and 16 over the marginal edge portions of the tongue portion 12 is of course to secure them in that position. To effectively secure them, the flaps 13 and 16 may be adhesively secured or they may be "heat staked" so that when the folding bars are retracted, the flaps remain engaged with the tongue portion and the envelope remains in-tact. Obviously, when adhesive is used, the adhesive must be deposited on the marginal portion of the tongue portion 12 over which the flaps 13 and 16 are to be contiguously superimposed. To effectively dispense or deposit such adhesive there is provided as illustrated in FIGS. 1, 4 and 5 an adhesive dispensing assembly designated generally by the numeral 91 and including a pair of laterally spaced glue dispensing cylinders 92 and 93, each having a discharge tip 94 in close proximity to the surface of the envelope blank on which the adhesive is to be deposited. It has been found that the deposit of a relatively thin line of adhesive on the tongue portion 12 of the envelope in a position to be spread by the contiguous superposition of the flaps 13 and 16 is adequate to secure the flaps permanently to the underlying tongue portion. Additionally, each of the adhesive cylinders 92 and 93 is connected by an air hose 96 through which air pressure is selectively imposed on the glue to effect its discharge and deposit upon the appropriate area of the envelope.

The adhesive cylinders 92 and 93 work in unison in that they deposit ribbons of adhesive simultaneously, the adhesive cylinders being supported on the forward ends of cantilever arms 97 and 98 which at corresponding ends remote from the cylinders are joined by a cross member 99 on which are appropriately mounted a pair of bearing sleeves 101 slidably journaled on spaced and parallel slide shafts 102 and 103. The forward end of the slide shafts 103 are secured in bearing blocks 104 mounted on the support plate 32, while the opposite ends of the slide shafts 103 are secured in a back plate 106 which extends upwardly from the main base plate 21.

Figure 14:
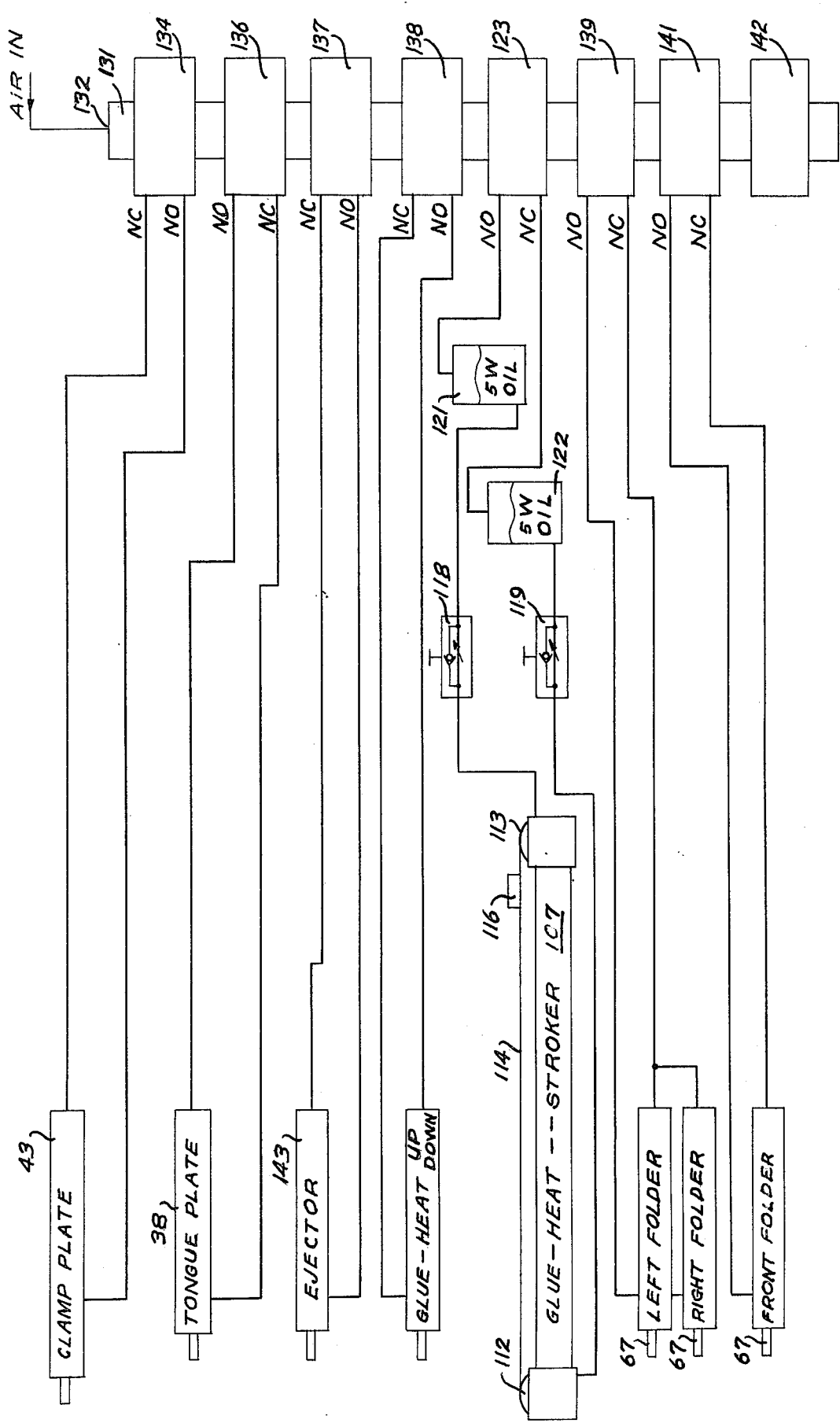
FIG. 14 is a schematic view of the pneumatic control system shown in relation to the functional elements of the machine controlled thereby.

To effect reciprocation of the adhesive-depositing assembly, there is provided a double acting hydraulic cylinder 107 mounted by appropriate support blocks 108 and 109 on the base plate 21, the double acting cylinder being shown schematically in FIG. 14, and including a pair of pulleys 112 and 113 over which runs a cable 114 on which is attached for movement with the cable a bracket 116 adapted to be interconnected by an appropriate connecting rod or plate 117 with the cross member 99 connecting the two cantilever arms 97 and 98.

Thus, operation of the cylinder 107 and lateral translation of the bracket 116 with the attached cantilever arms and adhesive cylinders is controlled by valves 118 and 119 each of which controls the flow of oil from associated reservoirs 121 and 122, air pressure on the oil reservoirs 121, 122 being imposed and controlled by an appropriate solenoid valve 123 connected to air manifold 131 as shown. To insure that the two adhesive cylinders 92 and 93 dispense adhesive in unison, it is important that they be pressurized to the same extent and for the same interval. Accordingly, to secure such effect, there is provided mounted on the forward end of the cantilever assemby 97–98 an air-operated solenoid valve 124 the outlet port of which is connected in parallel to the adhesive cylinders by means of conduits or flexible hose 96.

It has been found that a better and more uniform fold is achieved when tongue portion 12 and flaps 13 and 16 are folded if a predetermined amount of heat is applied to the blank prior to the folding operation. To accomplish such heating, there is mounted in close association with the platen 34 a front edge heater 126, a left edge heater 127 and a right edge heater 128. These heaters are cylindrical cartridgetype heaters. The heater controllers are commercial brand Eurotherm Type 103 temperature controllers, with the temperature generated by each being monitored by appropriate "J" type thermocouples 129 as shown.

The adhesive is deposited on the appropriate area in ribbon form during retraction of the adhesive-depositing assembly. In other words, subsequent to the front folding assembly 51 being actuated to fold back the tongue portion 12, the adhesive-depositing assembly is advanced to its most forward position by actuation of the 4-way solenoid valve 123. After a short delay of less than 100 microseconds during which the glue is pressurized, the adhesive is dispensed simultaneous to the adhesive assembly being withdrawn to its retracted position, the flow of adhesive being terminated at the appropriate instant so that a ribbon of adhesive of predetermined length is deposited on the envelope portion. Thereafter, the folding assemblies 52 and 53 are activated to fold the flaps 13 and 16 into contiguous superposed relation over the ribbon of adhesive and in contiguous contact with the underlying tongue portion 12.

We have found that the operation of the apparatus proceeds very satisfactorily under the control of the control circuitry illustrated in FIGS. 8 through 13 and the hydraulic and pneumatic circuitry illustrated in FIG. 14. Referring to FIG. 14, it will there be seen that the pneumatically actuated functions of the machine stem from a hollow manifold 131 to a source of air under pressure. Such source of air under pressure may conveniently be a bottle of pressurized air, or it may be an appropriate air compressor assembly. In any event, the manifold 131 is appropriately connected to eight four-way solenoid valves 134, 136, 137, 138, 123, 139, 141 and 142, as shown in FIG. 14.

The solenoid valve 134, by an appropriate signal controlled in point of time by the control circuits of FIGS. 8 through 13, controls actuation of the clamp plate 48 by actuation of the air cylinder 43. In like manner, the fourway solenoid valve 136 controls actuation of the tongue plate 38 by means of a similar cylinder (not shown) while the fourway solenoid valve 137 controls the ejector 143, which constitutes a generally rectangular frame surrounding the platen 34 and which is adapted to be pivoted upwardly a small amount to raise the tongue plate 38 from the surface of the platen so as to place the completed envelope in position to be grasped by the operator as illustrated in broken lines in FIG. 4. The ejector plate is appropriately pivoted on the support plate 32 so that the end thereof surrounding the platen 34 may be pivoted upwardly.

Actuation of the four-way solenoid valve 138 controls the application of adhesive from the adhesive cylinders 92 and 93. Solenoid valve 123 has already been described in connection with the operation of the cylinder 107. The folding assemblies 51, 52 and 53 have been previously described, each actuated by an air cylinder 67. Four-way solenoid valve 139 when actuated controls the lateral folding assemblies 52 and 53, which operate simultaneously, while the four-way solenoid valve 141 controls actuation of the front folding assembly 51. Obviously, the four-way solenoid valves are each connected to the manifold 131 and each of the valves in turn is appropriately connected by suitable flexible tubing to the air cylinder or other mechanism opearated by the air pressure transmitted therethrough.

It has been found that to increase production from the apparatus depicted in FIG. 1 it is advantageous that almost all functions be performed by the machine under appropriate computer control rather than by the operator. Obviously, some operations must be performed by the operator and in the machine depicted, after the machine is set up to run in the automatic mode, all that is required of the operator is that he insert the flat sheet blanks and remove the completed envelopes. Even these functions can be performed automatically by peripheral equipment forming no part of this invention. Also, if manual one-step operation is desired, this too is possible as will be explained.

It has also been found advantageous to provide means by which the operator is advised of a malfunction of the apparatus, and to indicate the nature of such malfunction so that it may be corrected expeditiously. To achieve these ends, the apparatus is provided with a switch panel 29 which includes thereon accessible to the operator a "start" switch 146, an "emergency stop switch" 147, which when actuated stops the machine cycle, a switch 148 to activate the display of a counter, a switch 149 to select adhesive or heat staking mode of operation, and a switch 151 which may be tripped to set the machine for manual operation or for automatic operation as desired as previously discussed. Additionally, a "reset" switch 152 is provided to reset the operation of the machine in any mode after the operation of the apparatus has been interrupted by actuation of the emergency "stop" switch 147.

Additionally, so that the operator may be advised of the particular operating parameters set up in the machine, the display section 28 is provided with display panels 153, 154, 156 and 157 which are correlated to the function being performed and which indicate numerically the time interval required for a particular function. For instance, display panel 153 is correlated to the front folding assembly 51, while the display panel 154 is correlated to the lateral or side folding assemblies 52 and 53. The display panel 156 is also correlated to the front folding assembly 51 and is utilized to indicate the delay imposed on the apparatus to adequately perform this function. Display panel 157 is correlated to the adhesive and heat cycle. The display panels and thumbwheel switches are a unitary component.

The data visible in these display panels is controlled through the thumbwheel switches 158, 159, 161, 162, 163, 164, 166, 167, 168, 169 and 170 as illustrated in FIG. 13. In the interest of brevity in the description, only thumbwheel switch 158 is depicted in full diagrammatic form, the remaining thumbwheel switches being identical. It has been found that a satisfactory thumbwheel switch is available commercially from Unimax under the trade designation FS-1. These thumbwheel switches are connected appropriately as illustrated to the printed circuit display board 172 shown in FIG. 13.

Various of the functions of the apparatus are controlled in response to optoelectronic interruptor modules 174, 176, 177, 178, 179, 181, 182, 183 and 184 as depicted in FIG. 13. In the interest of brevity, since all of these optoelectronic interruptor modules are identical, only module 174 has been illustrated in diagrammatic detail. Satisfactory optoelectronic interruptor modules may be purchased from General Electric under the trade designation H1B2. As illustrated in FIG. 13, the optoelectronic interruptor modules are appropriately connected to the main printed circuit computer board 186.

The types of functions sensed by these optoelectronic interruptor modules include sensing the top and bottom positions of the folding assembly 53 by modules 174 and 176, while the back and forward stroke limits of the adhesive applying assembly are detected by the modules 177 and 178. In like manner, the front folding assembly 51 and its extremes of travel are detected by modules 179 and 181, while the right hand folding assembly 52 is monitored in its operation by modules 182 and 183. Placement of the blank in its appropriate position is detected by module 184.

Power to the apparatus is derived from an appropriate source of 120 volt alternating current, 50–60 Hertz, through a 3-wire circuit as illustrated in FIG. 12. Power from the source is channelled to the heaters 126–128 as previously described, and to a power supply 187 which may conveniently be a Power-One model HC5-6. The power supply 187 is provided with output power terminals 188 and 189 for connection to the appropriate terminals of the control circuitry. Power from the source is also channelled to the electromagnet 31 as depicted in FIG. 12, and to the electrically operated pneumatic valves 134, 136, 137, 138, 123, 139 and 141 as shown. Appropriate terminals of these electrically operated pneumatic valves are appropriately connected to an Opto 22 input/output (I/O) module rack 191, conveniently of type PB-16A using solid state relay type OAC-5. The electromagnet 31 is energized through an appropriate rectifier 192.

Figure 8:
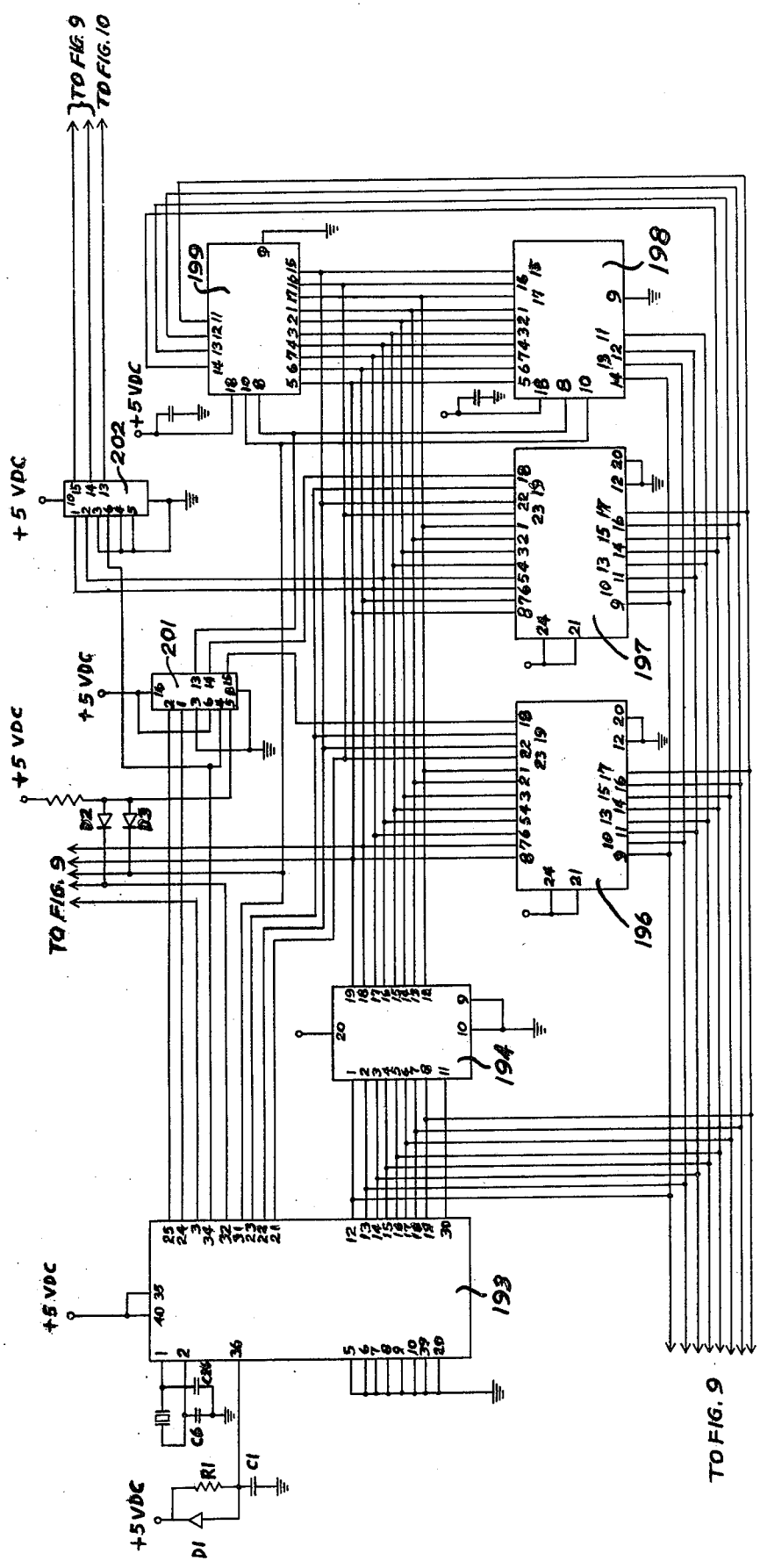
FIG. 8 is a schematic view of the central processing unit (CPU) printed circuit card portion of the computer control system.

To monitor and control the functions of the apparatus, reference is made to sheet 5, FIG. 8, where a central processor unit (CPU) section is depicted diagramatically, the central processor unit including a single chip microprocessor 193 designated by the trade designation 8085 and available from Intel. The microprocessor is connected as shown to an Intel 8282 eight byte octal latch chip designated generally by the numeral 194. The octal latch 194 is connected in turn as illustrated to a pair of PROMS designated generally by the numerals 196 and 197 and available from Intel under the trade designation 2716. The eight byte octal latch 194 is also connected to a pair of 4K RAM chips designated 198 and 199 and available from Intel under the trade designation 2114. Included in the circuit are two Intel 3205 decoders designated here by the numerals 201 and 202.

Figure 9:
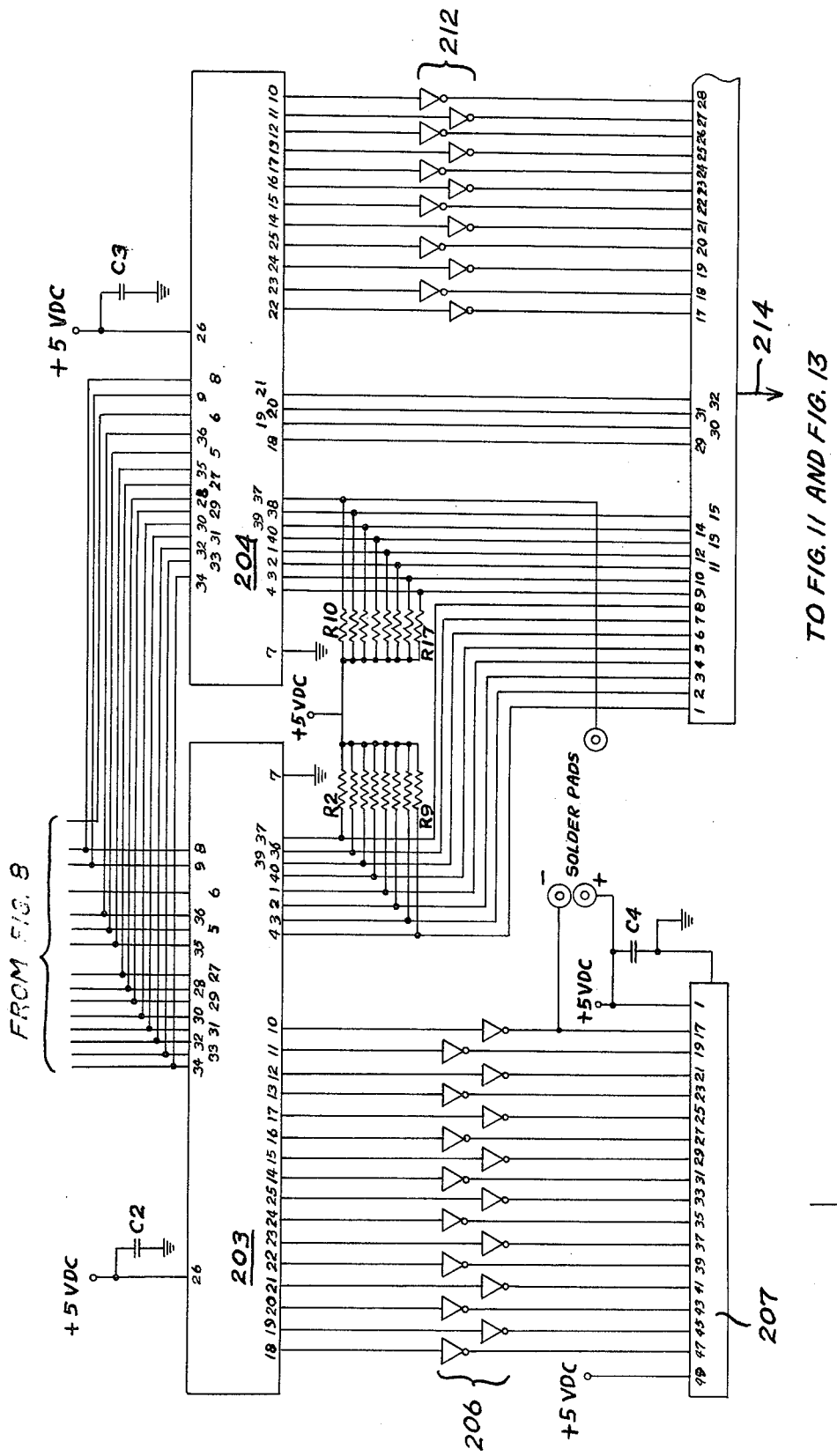
FIGS. 9 and 10 are schematic views of the printed circuit boards included in the input/output (I/O) section of the computer control system.

As indicated by the legends on FIG. 8, the CPU section is connected as shown to the Intel 8255 universal peripheral interface members 203 and 204 illustrated in FIG. 9 (Sheet 6). The peripheral interface member 203 is in turn connected through the SN7405 hex inverter section 206 to the 50-pin card-edge connector 207, which is in turn connected by a 50-conductor ribbon cable 208 (FIG. 12, Sheet 9) to the Opto 22 input/output (I/O) module rack 191 to which the AC drivers are connected. Peripheral interface members 203 and 204 are also connected by groups of leads as shown to the 40-pin Ansley header ribbon connector 209. Peripheral interface member 204 is also connected to the Ansley header connector 209 by the SN7405 hex inverter section 212 as shown.

Figure 10:
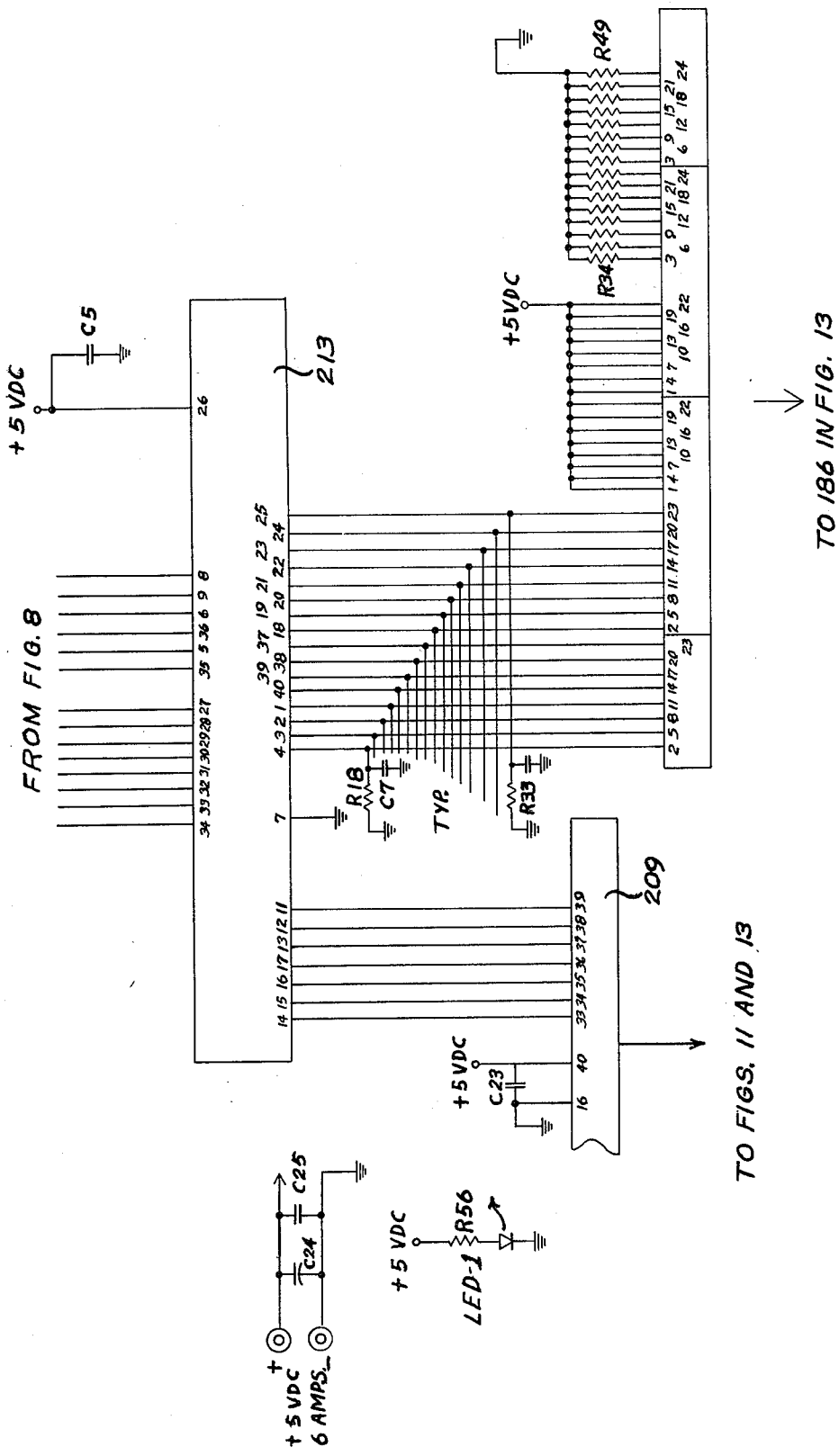
Figure 11:
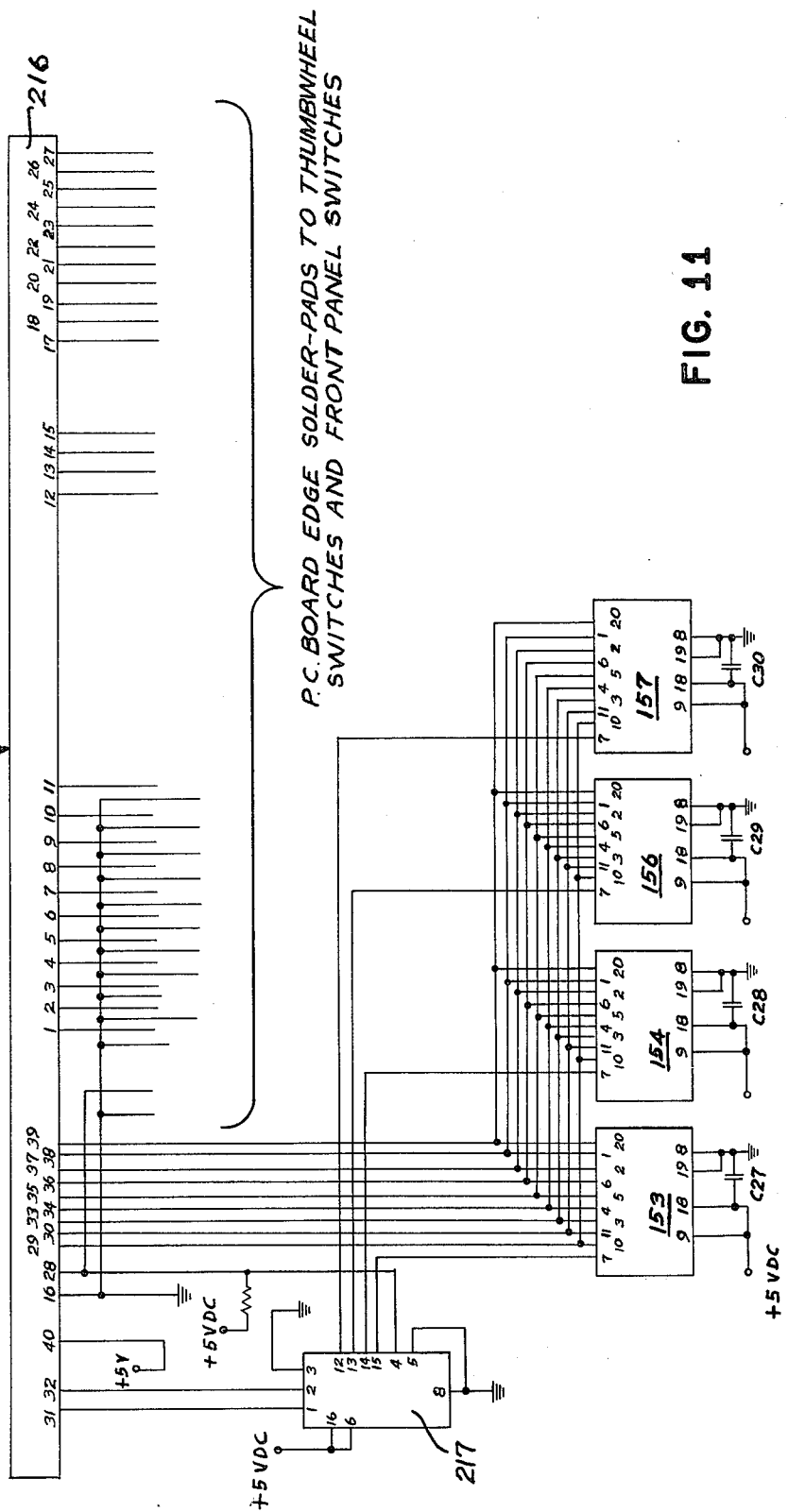
FIG. 11 is a schematic view of the envelope folder display panel.

Referring to FIG. 10, it will there be seen that a third Intel 8255 universal peripheral interface member 213 is provided with a group of leads connected to Ansley header connector 209, portions of which are illustrated in FIGS. 9 and 10. This peripheral interface member 213 is also connected as shown to the microprocessor 193 (FIG. 8) in the same manner as interface members 203 and 204.

The Ansley header connector 209, portions of which are shown in FIGS. 9 and 10, is connected by means of an appropriate ribbon cable interconnect 214 to the 40-pin Ansley right-angle header connector 216 (FIG. 11), from which appropriate leads are connected to the thumbwheel switches and front panel switches. Also connected to the header connector 216 is an Intel 3205 decoder 217 and the alphanumeric display modules 153, 154, 156 and 157 as shown.

We have found that suitable results can be expected using the following components and the values indicated, in addition to the components discussed above:

| Capacitors | | | |
|---|---|---|---|
| C1–C3, C5, C23, C25, C27–C30 | 0.1 μF | D1–D3 | Intel 914 |
| C4 | 1.0 μF | D4 | Intel 4007 |
| C6 | 20 pF | | |
| C24 | 100.0 μF | | |
| C26 | 20.0 pF | | |
| Resistors | | | |
| R1 | 30K Ohms | | |
| R2–R17 | 4.7K Ohms | | |
| R18–R33 | 10K Ohms | | |
| R34–R49 | 220 Ohms | | |
| R35 | 27K Ohms (10 Watts) | | |
| R36 | 4.7K Ohms | | |
| R50 | 4.7K Ohms | | |
| R56 | 220 Ohms | | |

Having thus described the invention, what is believed to be novel and sought to be protected by letters patent of the United States is as follows:

We claim:

1. Apparatus for automatically forming a pre-cut flat sheet blank of polyvinyl chloride or paper into an envelope having three closed edges and one open edge for the storage of floppy or rigid discs on which data is recorded, comprising:
    (a) means having a flat platen for receiving in flat form thereon and clamping in flat form thereon said pre-cut flat sheet blank from which the envelope is to be formed;
    (b) means operatively associated with said receiving and clamping means and a pre-cut flat sheet blank clamped thereby operable to sequentially fold predetermined portions of said pre-cut blank into overlapping relation with other associated sequentially folded portions;
    (c) means operable to join selected sequentially folded predetermined portions of said blank over other sequentially folded predetermined portions in overlapping relation whereby to form said envelope; and
    (d) means operatively associated with said receiving and clamping means, said means for sequentially folding the blank, and said means for joining overlapped sequentially folded portions of said envelope to control the sequence of operation thereof.

2. The combination according to claim 1, in which said means having a flat platen for receiving and clamping said pre-cut flat sheet blank in flat form thereon includes an electromagnet incorporating said platen on which said blank is deposited, and a ferromagnetic tongue plate movable into superimposed relationship with said blank and said platen whereby said tongue plate impinges on said blank and completes a magnetic circuit with said electromagnet to firmly clamp the blank to the platen in flat form thereon.

3. The combination according to claim 1, in which said means operable to join selected predetermined portions of said blank over other predetermined portions includes at least one glue dispensing head adapted to contain glue to be dispensed, means operatively associated with said glue dispensing head for effecting translation of said glue dispensing head over an area to be joined, and means for selectively applying dispensing pressure on the glue in said glue dispensing head to effect dispensing thereof on the underlying area of the blank.

4. The combination according to claim 1, in which said means operatively associated with said receiving and clamping means, said means for sequentially folding the blank and said means for joining overlapped portions of the envelope blank to control the sequence of operation thereof comprises a computer including a microprocessor, a programmable read-only memory section, a random access memory section and input/output circuits.

5. The combination according to claim 2, in which optical sensing means are provided associated with said platen and operative to sense the proper or improper placement of said pre-cut flat sheet blank, and means for displaying to the operator the fact of improper placement of the blank.

6. The combination according to claim 2, in which said tongue plate is pivotally mounted adjacent said platen, and means are provided actuable to effect selective pivotal movement of said tongue plate.

7. The combination according to claim 1, in which said clamp plate is non-ferrous and non-magnetic.

8. The combination according to claim 1, in which a ferromagnetic tongue plate is provided to clamp a blank to the platen whereby marginal edge portions of the blank extend from under the tongue plate, and said clamp plate is proportioned in relation to said tongue plate so that edge portions of said tongue plate extend from under the clamp plate.

9. The combination according to claim 2, in which said tongue plate is pivotally mounted adjacent said platen, and an air cylinder is provided including a ram connected to said tongue plate and selectively actuable to pivot the tongue plate into clamping relationship with said platen to clamp thereon a flat sheet blank from which the envelope is to be formed.

10. The combination according to claim 1, in which said clamp plate clamps said tongue portion of said blank to the underlying tongue plate.

11. The combination according to claim 1, in which front, left and right side slide base plates are provided each operatively associated with a slide plate slidably mounted thereon and a folding bar pivotally mounted on each slide plate.

12. The combination according to claim 1, in which said means operatively disposed between the slide base plate on the one hand and the slide plate and folding bar on the other hand includes an air cylinder including a ram selectively operable to advance and retract said slide plate between said predetermined first and second limits, and to effect pivotal movement of said folding bar between first and second positions following advance of said slide plate to said first predetermined limit.

13. The combination according to claim 1, in which optical sensing means are provided associated with said slide plate to sense the presence of said slide plate at the first or second predetermined limits of its displacement.

14. The combination according to claim 1, in which said folding bar is generally triangular in cross-section having a base surface substantially in planar alignment with said means for receiving said pre-cut flat sheet blank and underlying said flat sheet blank when said folding bar is in a first retracted position and an adjacent side surface pivotal into superposed impinging relationship on a marginal edge portion of said flat sheet blank when said folding bar is pivoted to a second extended position.

15. The combination according to claim 3, in which a pair of said glue dispensing heads are provided spaced apart to overlie marginal edge portions of a flat sheet blank clamped on said means for receiving said blank, said means for effecting translation of said pair of glue dispensing heads including a pair of spaced slide shafts on which said glue dispensing heads are reciprocably mounted, and an air cylinder including a ram operatively associated with said glue dispensing heads to effect reciprocable translation thereof.

16. The combination according to claim 3, in which said means for selectively applying dispensing pressure on the glue in the glue dispensing head includes a source of air under pressure, and an electromagnetic solenoid valve selectively operable to impose air pressure on said glue.

17. The combination according to claim 4, in which said programmable read-only memory section is programmed to scan for performance of said means for receiving and clamping said flat sheet blank, said means for folding said blank and said means for joining selected predetermined portions of the blank and controlling the sequence of performance of said various means.

18. The combination according to claim 11, in which said means operatively disposed between each slide base plate and the associated folding bar includes an air cylinder having a ram pivotally connected to said folding bar and selectively operable to pivot said folding bar through 45° from a first retracted position to a second extended position, and means for resiliently biasing said folding bar toward said first retracted position.

19. The combination according to claim 12, in which spring means are provided resiliently interposed between said folding bar and said slide plate and resiliently biasing said folding bar toward said first retracted position.

20. Apparatus for automatically forming a pre-cut flat sheet blank of polyvinyl chloride or paper into an envelope having three closed edges and one open edge for the storage of floppy discs on which data is recorded, comprising:
  (a) a support base;
  (b) an envelope-forming assembly supported on the support base and including:
    (1) a platen for receiving said flat sheet blank;
    (2) a tongue plate pivotally mounted for selective impingement with said platen and normally spaced therefrom to permit placement of said flat sheet blank on said platen;
    (3) a clamp plate pivotally mounted for selective impingement on said tongue plate;
    (4) a plurality of folding bars associated adjacent front, left and right side edges of said platen and selectively pivotal to fold predetermined portions of said flat sheet blank upon itself;
    (5) a pair of glue dispensing heads spaced apart to overlie marginal edge portions of an underlying flat sheet blank clamped on said platen and selectively reciprocable between a retracted position and an extended position in which said glue dispensing heads overlie said marginal edge portions of the blank; and (c) computer means including a microprocessor, a programmable read-only memory section, a random access memory section and input/output circuits connected to said envelope forming assembly to control the operating functions thereof and the sequencing of performance of said functions.

21. The combination according to claim 20, in which optoelectronic sensor means are provided to sense placement of a flat sheet blank on said platen whereby said computer is signaled that the blank is in place.

22. The combination according to claim 20, in which means are provided for energizing said apparatus, means are provided controlled by said computer for heating a predetermined area of said blank along a fold line thereof, means controlled by said computer for activating said front folding bar to fold back upon the tongue plate a tongue portion of said blank, optoelectronic sensor means operatively associated with said front folding bar effective to signal the computer that the tongue portion has been folded back upon the tongue plate, means controlled by said computer for activating said clamp plate to clamp said tongue portion of the blank to said tongue plate, means controlled by said computer for activating said pair of glue dispensing heads to advance said heads to said first extended position, optoelectronic sensor means for sensing the glue dispensing heads in extended position and operative to signal the computer to start the glueing function, means controlled by the computer for retracting said glue dispensing heads and simultaneously dispensing glue on the underlying blank, optoelectronic means for sensing and signaling to said computer completion of retraction of said glue dispensing heads and for activating said left and right side folding bars to fold marginal edge portions of said blank upon associated marginal portions of the folded back tongue portion of the blank, and means controlled by said computer for energizing said left and right side folding bars to fold said marginal portions over said tongue portion to form said envelope.

23. The method of forming a pre-cut flat sheet blank of polyvinyl chloride or paper into an envelope having three closed edges and one open edge for the storage of floppy discs on which data is recorded, comprising the steps of:
(a) arranging the flat sheet blank on a flat platen;
(b) causing said flat sheet blank to be clamped immovable on said platen;
(c) heating predetermined elongated zones of said flat sheet blank defining a quadrilateral area;
(d) causing a tongue portion of said flat sheet blank to be folded back upon itself along one of said heated zones to provide with the remainder of said blank the two sides of an envelope;
(e) causing said folded-back tongue portion to be clamped in close juxtaposition to said remainder of the blank;
(f) causing a ribbon of glue to be deposited along marginal edge portions of said folded-back tongue portion; and
(g) causing lateral edge portions of the flat sheet blank underlying the folded back tongue portion to be folded over upon associated marginal edge portions of the folded back tongue portion upon which said ribbons of glue were deposited.

24. The method according to claim 23, in which one of said elongated zones along which the tongue portion is folded is heated first and said tongue portion is then folded back upon the blank, and the remaining elongated zones are heated subsequent to said tongue portion being folded back upon itself.

25. Apparatus for automatically forming a pre-cut flat sheet blank of polyvinyl chloride or paper into an envelope having three closed edges and one open edge for the storage of floppy or rigid discs on which data is recorded, comprising:
(a) means for receiving and clamping said pre-cut flat sheet blank from which the envelope is to be formed;
(b) means operatively associated with said receiving and clamping means and a pre-cut flat sheet blank clamped thereby operable to sequentially fold predetermined portions of said pre-cut blank into overlapping relation;
(c) means operable to join selected predetermined portions of said blank over other predetermined portions in overlapping relation whereby to form said envelope; and
(d) means operatively associated with said receiving and clamping means, said means for sequentially folding the blank, and said means for joining overlapped portions of said envelope to control the sequence of operation thereof;
(e) said means for receiving and clamping said pre-cut flat sheet blank including an electromagnet having a platen on which said blank is deposited, and a clamp plate pivotally mounted adjacent said electromagnet and movable into impinging superimposed relationship with said envelope blank to clamp a tongue portion of said blank which has been folded back upon itself.

26. Apparatus for automatically forming a pre-cut flat sheet blank of polyvinyl chloride or paper into an envelope having three closed edges and one open edge for the storage of floppy or rigid discs on which data is recorded, comprising:
(a) means for receiving and clamping said pre-cut flat sheet blank from which the envelope is to be formed;
(b) means operatively associated with said receiving and clamping means and a pre-cut flat sheet blank clamped thereby operable to sequentially fold predetermined portions of said pre-cut blank into overlapping relation;
(c) means operable to join selected predetermined portions of said blank over other predetermined portions in overlapping relation whereby to form said envelope; and
(d) means operatively associated with said receiving and clamping means, said means for sequentially folding the blank, and said means for joining overlapped portions of said envelope to control the sequence of operation thereof;
(e) said means operatively associated with said receiving and clamping means operable to sequentially fold predetermined portions of a blank including at least one slide base plate, a slide plate slidably mounted on said slide base plate and selectively movable between predetermined first and second limits, a folding bar pivotally mounted on said slide plate and pivotal to fold an associated portion of said blank back upon itself, and means operatively disposed between said slide base plate on the one hand and said slide plate and folding bar on the other hand to selectively effect movement of said slide plate and folding bar.

27. Apparatus for automatically forming a pre-cut flat sheet blank of polyvinyl chloride or paper into an envelope having three closed edges and one open edge for the storage of floppy or rigid discs on which data is recorded, comprising:

(a) means for receiving and clamping said pre-cut flat sheet blank from which the envelope is to be formed;

(b) means operatively associated with said receiving and clamping means and a pre-cut flat sheet blank clamped thereby operable to sequentially fold predetermined portions of said pre-cut blank into overlapping relation;

(c) means operable to join selected predetermined portions of said blank over other predetermined portions in overlapping relation whereby to form said envelope;

(d) means operatively associated with said receiving and clamping means, said means for sequentially folding the blank, and said means for joining overlapped portions of said envelope to control the sequence of operation thereof;

(e) said means for receiving and clamping said pre-cut flat sheet blank including an electromagnet having a platen on which said blank is deposited, and ferromagnetic tongue plate movable into superimposed relationship with said blank and said platen whereby said tongue plate impinges on said blank and completes a magnetic circuit with said electromagnet to firmly clamp the blank to the platen; and (f) an ejector frame surrounding said platen and underlying said tongue plate, and means for selectively displacing said ejector plate in a direction away from said platen so as to displace said tongue plate away from said platen.

28. Apparatus for automatically forming a pre-cut flat sheet blank of polyvinyl chloride or paper into an envelope having three closed edges and one open edge for the storage of floppy or rigid discs on which data is recorded, comprising:

(a) means for receiving and clamping said pre-cut flat sheet blank from which the envelope is to be formed;

(b) means operatively associated with said receiving and clamping means and a pre-cut flat sheet blank clamped thereby operable to sequentially fold predetermined portions of said pre-cut blank into overlapping relation;

(c) means operable to join selected predetermined portions of said blank over other predetermined portions in overlapping relation whereby to form said envelope;

(d) means operatively associated with said receiving and clamping means, said means for sequentially folding the blank, and said means for joining overlapped portions of said envelope to control the sequence of operation thereof; and (e) heater means adjacent said platen and selectively energizable to heat selected areas of said flat envelope blank prior to folding thereof.

* * * * *